United States Patent [19]

Kamada et al.

[11] Patent Number: 5,646,703
[45] Date of Patent: Jul. 8, 1997

[54] LIQUID CRYSTAL DISPLAY

[75] Inventors: Koh Kamada; Hiroko Kozono; Jun Watanabe; Kohei Arakawa, all of Kanagawa, Japan

[73] Assignee: Fuji Photo Film Co., Ltd., Minami-ashigara, Japan

[21] Appl. No.: 310,101

[22] Filed: Sep. 22, 1994

[30] Foreign Application Priority Data

| Sep. 22, 1993 | [JP] | Japan | 5-236539 |
| Apr. 20, 1994 | [JP] | Japan | 6-081781 |
| May 31, 1994 | [JP] | Japan | 6-118963 |

[51] Int. Cl.$^6$ ............... G02F 1/1335; G02F 1/1347
[52] U.S. Cl. ............................................ 349/118; 349/75
[58] Field of Search ..................... 359/73, 63, 102, 359/53; 349/75, 76, 118, 120

[56] References Cited

U.S. PATENT DOCUMENTS

| 4,678,287 | 7/1987 | Buhrer | 359/498 |
| 5,126,866 | 6/1992 | Yoshimizu | 359/63 |
| 5,138,474 | 8/1992 | Arakawa | 359/73 |
| 5,184,236 | 2/1993 | Miyashita | 359/63 |
| 5,189,538 | 2/1993 | Arakawa | 359/63 |
| 5,249,071 | 9/1993 | Yoshimizu | 359/73 |
| 5,308,535 | 5/1994 | Scheuble et al. | 359/73 |
| 5,375,006 | 12/1994 | Haas | 359/63 |
| 5,413,657 | 5/1995 | Yamanashi | 359/73 |
| 5,430,565 | 7/1995 | Yamanouchi | 359/73 |
| 5,456,867 | 10/1995 | Mazaki | 359/73 |
| 5,460,748 | 10/1995 | Mazaki | 359/73 |
| 5,472,635 | 12/1995 | Iida | 359/73 |
| 5,518,783 | 5/1996 | Kawata et al. | 359/73 |
| 5,583,679 | 12/1996 | Ito et al. | 349/120 |

FOREIGN PATENT DOCUMENTS

| 350075 | 1/1990 | European Pat. Off. | 359/73 |
| 352724 | 1/1990 | European Pat. Off. | 359/73 |

*Primary Examiner*—William L. Sikes
*Assistant Examiner*—Tiep H. Nguyen
*Attorney, Agent, or Firm*—Burns, Doane, Swecker & Mathis, LLP

[57] ABSTRACT

Disclosed is a liquid crystal display provided with an optical compensatory sheet consisting essentially of a transparent support and a layer prepared from a discotic liquid crystal of a low molecular weight, or an optical compensatory sheet which has the minimum of absolute values of retardation values in a direction inclined from the normal of the sheet and has no optic axis.

21 Claims, 4 Drawing Sheets

LIQUID CRYSTAL DISPLAY

BACKGROUND OF THE INVENTION

1. Field of the Invention

The present invention relates to a liquid crystal display provided with an optically compensatory sheet.

2. Description of Prior Art

As a display for electronic office system-devices such as a desk-top personal computer and a word processor for the Japanese language, CRT (cathode ray tube) has been employed. Recently, liquid crystal displays (hereinafter referred to as LCDS) are increasingly employed instead of CRTS because of their thickness, light weight and low power consumption. LCDS generally have a structure that a liquid crystal cell is disposed between a pair of polarizing sheets. Most LCDS use a twisted nematic liquid crystal. Operational modes of LCDS using the twisted nematic liquid crystal are roughly divided into birefringence mode and optical rotatory mode.

A super twisted nematic liquid crystal display (hereinafter referred to as STN-LCD) utilizing the birefringence mode uses a super twisted nematic liquid crystal showing a twisted angle of more than 90 degrees and having steep electro-optical characteristics. Such a STN-LCD, therefore, has an advantage of providing a display of a large capacity by being driven in a time-sharing mode. However, the STN-LCD has disadvantages such as slow response (several hundred milliseconds) and difficulty in giving satisfactory gradation on display, and therefore its display characteristics are relatively poor, as compared with display characteristics of a liquid crystal display using the known active-type elements (e.g., TFT-LCD and MIM-LCD).

In the TFT-LCD and MIM-LCD, a twisted nematic liquid crystal showing a twisted angle of 90 degrees is employed for displaying an image. This is called an LCD of an optically rotary mode (i.e., TN-LCD). TN-LCD display mode shows fast response (several tens of milliseconds) and high display contrast, and easily gives a black-white display of high contrast. Hence, the optical rotatory mode has a number of advantages compared with the birefringence mode or other modes. However, TN-LCD has disadvantages that color or contrast on display varies depending upon viewing direction to a liquid crystal display, and its display characteristics are not comparable to display characteristics of CRT.

In order to improve the viewing angle characteristics (i.e. to enlarge the viewing angle), an arrangement of a phase difference film (optically compensatory sheet) between a pair of polarizing plates and TN liquid crystal cell has been proposed in Japanese Patent Provisional Publications No. 4(1992)-229828 and No. 4(1992)-258923.

The phase difference films proposed in these Publications show no optical effect when seen from the direction vertical to a screen of a liquid crystal display because phase difference in the direction perpendicular to a surface of the liquid crystal display is almost zero. However, the phase difference film serves for compensation of phase difference (depending upon wavelengths of light) that occurs when the liquid crystal display is viewed from an oblique direction. The phase difference results in unfavorable viewing angle characteristics such as coloring and disappearance of displayed image.

Even a liquid crystal display provided with such a phase difference film is still not improved particularly in coloring of a displayed image and reversing of black-and-white image when the viewing direction to the liquid crystal display is greatly inclined to above or below, or right or left, to the normal to a surface of the screen. Thus, such liquid crystal display cannot be employed instead of CRT, and further is not suitable for loading mounting in a vehicle.

Japanese Patent Provisional Publications No. 4(1992) 66808 and No. 4(1992)-366809 disclose a difference phase film of a liquid crystal cell comprising a chiral nematic liquid crystal that an optic axis is inclined to enlarge the viewing angle. The difference phase film is composed of two liquid crystal cells, and therefore needs a complicated process for its preparation and brings about increase of its weight.

Japanese Patent Provisional Publications No. 4(1992) 13301, No. 5(1993)-8323 and No. 5(1993)-157913 disclose a phase difference film of chain polymer whose optic axis or an optical elastic axis is inclined from a surface of a liquid crystal cell. The phase difference film is prepared by slicing obliquely a uniaxial polycarbonate film, and therefore a phase difference film of a large area cannot be easily prepared according to the disclosed process. Further, the publications are for inventions with regard to STN-LCD and therefore give no teachings as to the use with TN-LCD.

Japanese Patent Provisional Publication No. 5(1993) 215921 discloses the use of a birefringence plate comprising a pair of supports and a rod-like compound showing a liquid crystal property. The rod-like compound showing a liquid crystal property is prepared by interposing and curing the compound to give a compensation difference phase of LCD. However, the birefringence plate has the same structure as one of the two liquid crystal cells as mentioned above, and therefore needs a complicated process for its preparation, which is not suitable for mass production. Further, its structure brings about an increase in weight. Furthermore, the publications are for inventions with regard to STN-LCD and therefore give no teachings as to the use for TN-LCD.

Japanese Patent Provisional Publications No. 3(1991) 9326 and No. 3(1991)-291601 disclose an optically compensatory sheet for LCD which is prepared by coating a solution of a polymer showing liquid crystal property on an alignment film provided on a support film. However, the polymer showing liquid crystal property is not satifactorily oriented on the alignment film. Hence, the resulting compensatory scarcely enlarges the viewing angle from all directions.

EP 0576302 A1 discloses a phase difference plate comprising a material having optical anisotropy in a flat plate in which the direction of the principal refractive index of the index ellipsoid is inclined to the normal of the surface. The disclosed phase difference plate shows great enlargement of the viewing angle compared with other known phase difference films as mentioned above. However, a LCD provided with such phase difference plate is not comparable to CRT in the viewing angle characteristics.

SUMMERY OF THE INVENTION

It is an object of the present invention to provide a liquid crystal display provided with a novel optical compensatory sheet which is greatly improved in coloring of a displayed image and reversing of black-and-white image when the viewing direction to the liquid crystal display is greatly inclined to either above or below, or to either right or left of a line normal to a surface of the screen.

There is provided by the invention a liquid crystal display comprising a liquid crystal cell which comprises a pair of substrates provided with a transparent electrode and twist-oriented nematic liquid crystal sealed therebetween, a pair of polarizing sheets arranged on both side of the cell, and at least one optical compensatory sheet provided between the liquid crystal cell and at least one polarizing sheet;

wherein the optical compensatory sheet comprises a transparent support and a layer provided thereon which is prepared from a discotic liquid crystal of a low molecular weight.

Preferred embodiments of the liquid crystal display of the present invention are as follows:

1) The liquid crystal display wherein the layer of a discotic liquid crystal has an optic axis inclined from the normal of the layer.

2) The liquid crystal display wherein the layer of a discotic liquid crystal has an optic axis inclined at 5 to 50 degrees to the normal (i.e., normal line) of the layer.

3) The liquid crystal display wherein an orientation film is provided between the transparent support and the layer of a discotic liquid crystal.

4) The liquid crystal display 3) wherein the orientation film is a polymer film which has been subjected to rubbing treatment.

5) The liquid crystal display 3) wherein the orientation film is a film of polyvinyl alcohol having an alkyl group which has been subjected to rubbing treatment 6) The liquid crystal display 3) wherein the orientation film is prepared by obliquely depositing an inorganic compound on the support.

7) The liquid crystal display wherein the transparent support has a light transmittance of not less than 80%, shows optically isotropy on the plane of the support, and satisfies the condition of:

$$30 \leq \{(nx+ny)/2-nz\} \times d \leq 150$$

in which nx and ny are main refractictive indices on the plane of the support, nz is a main refractive index in the thickness direction, and d is the thickness of the support, unit of d being nm.

8) The liquid crystal display wherein the transparent support is a triacetyl cellulose film.

9) The liquid crystal display wherein the transparent support has a negative uniaxial property and an optic axis in the normal line direction.

There is further provided by the invention a liquid crystal display comprising a liquid crystal cell which comprises a pair of substrates provided with a transparent electrode and twist-oriented nematic liquid crystal sealed therebetween, a pair of polarizing sheets arranged on either side of the cell, and an optical compensatory sheet provided between the liquid crystal cell and the polarizing sheet;

wherein the optical compensatory sheet has the minimum of absolute values of retardation values in a direction inclined from the normal of the sheet and has no optic axis.

Preferred embodiments of the liquid crystal display of the present invention are as follows:

1) The liquid crystal display wherein the optical compensatory sheet comprises two elements having optical anisotropy and optical characteristics differing from each other, in which one of the elements has an optically negative monoaxial and an optic axis in the normal direction of the element, and the other element has an optically negative monoaxial and an optic axis inclined at 5 to 50 degrees to the normal of the element.

2) The liquid crystal display wherein the element having an optically negative monoaxial which is inclined at 5 to 50 degrees to the normal of the film is a layer prepared from a discotic liquid crystal of a low molecular weight.

3) The liquid crystal display wherein wherein the element having an optically negative monoaxial and an optic axis in the normal direction has a light transmittance of not less than 80%, shows optically isotropy on the plane of the support, and satisfies the condition of:

$$30 \leq \{(nx+ny)/2-nz\} \times d \leq 150$$

in which nx and ny are main refractictive indices on the plane of the support, nz is a main refractive index in the thickness direction, and d is the thickness of the support, unit of d being nm.

4) The liquid crystal display wherein the element having an optically negative monoaxial and an optic axis in the normal direction is a triacetyl cellulose film.

The optical compensatory sheet employed for the liquid crystal display of the invention is advantageously prepared by a process of the invention comprising the steps of:

forming an orientation film on a transparent support, forming a layer prepared from a discotic liquid crystal (of a low molecular weight) on the orientation film by coating method, and heating the layer of a discotic liquid crystal at a temperature of not less than a transition temperature of from the liquid crystal phase to the solid phase.

The optical compensatory sheet employed for the liquid crystal display of the invention is greatly improved in coloring of a displayed image and reversal of black-and-white when the viewing direction is greatly inclined in an upper-lower or light-left direction to the normal to a surface of the screen. Thus, the liquid crystal display provided with the optical compensatory sheet shows excellent viewing characteristics such as largely increased of viewing angle.

DETAILED DESCRIPTION OF THE INVENTION

The liquid crystal display of the invention is characterized by the use of the novel optical compensatory sheet. The optical compensatory sheet of the invention can be prepared in the following manner:

The optical compensatory sheet can be, for example, prepared by forming an orientation film on a transparent support and forming a layer from a discotic liquid crystal on the orientation film by coating method.

As material of the transparent support of the invention, any material can be employed so long as they are transparent. The material preferably has a transmittance of not less than 80% and specially show optical isotropy when it is viewed from a front side. Further, the support preferably has a negative uniaxial property and an optic axis in the normal line direction.

Therefore, the support is preferably prepared from materials having a small intrinsic birefringence, such as triacetyl cellulose. Such material is available on market by the trade name of Geonex (from Nippon Geon Co., Ltd.), Arton (from Japan Synthetic Rubber Co., Ltd.) and Fujitack (from Fuji Photo Film Co., Ltd.).

However, materials having a large intrinsic birefringence such as polycarbonate, polyarylate, polysulfone and polyethersulfone can be also employed by rendering the materials optically isotropic through appropriately controlling molecular orientation in a procedure of forming a film.

The transparent support preferably satisfies the condition of:

$$0 \leq |nx+ny| \times d \leq 50 \ (nm)$$

and more preferably:

$$0 \leq |nx+ny| \times d \leq 20 \ (nm)$$

in which nx and ny is main refractictive indices within the support and d is a thickness direction of the support.

Especially, the transparent support preferably satisfies the condition of:

$$20 \leq \{(nx+ny)/2-nz\} \times d \leq 300 \ (nm)$$

in which nx and ny is main refractictive indices on the plane of the support and nz is a main refractive index in a thickness direction of the support, whereby the viewing angle can be greatly increased. Further, the transparent support preferably satisfies the condition of:

$$30 \leq \{(nx+ny)/2-nz\} \times d \leq 150 \ (nm)$$

Figure 1:
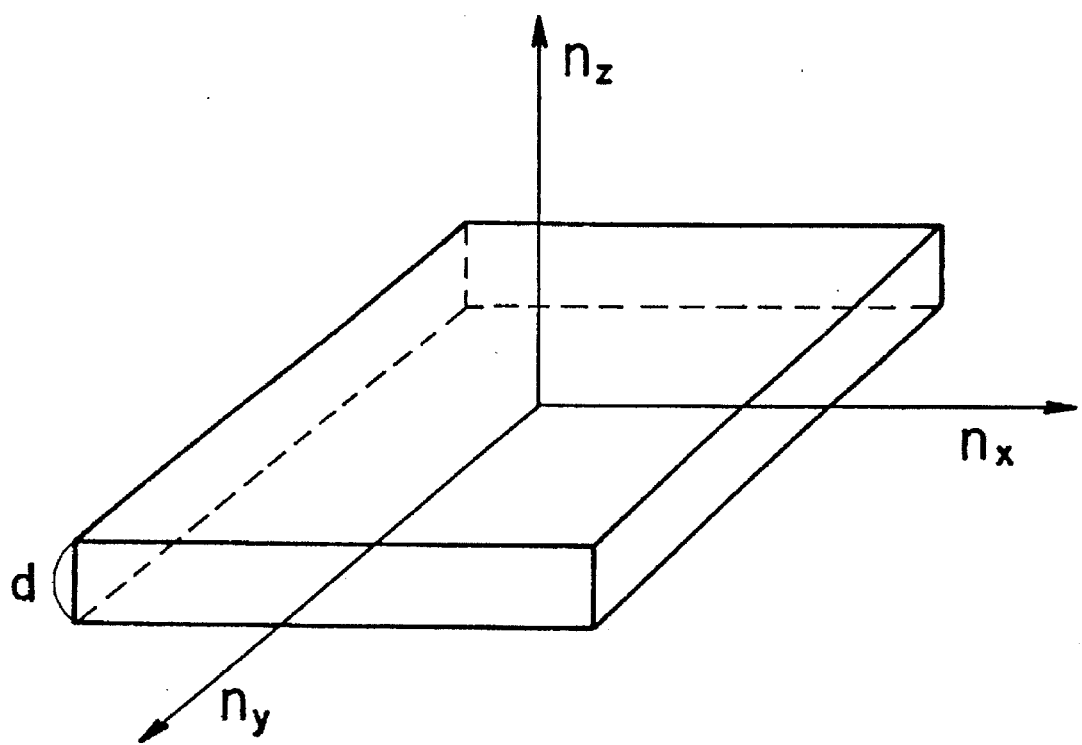
FIG. 1 is a sectional view schematically showing the refractive indices of the three axes of the support.

FIG. 1 shows "nx", "ny", "nz" and "d" described above. "nx" and "ny" are main refractictive indices on the plane of the support, "nz" is a main refractive index in a thickness direction of the transparent support and d is the thickness of the support.

The orientation film is generally provided on the transparent support. As the orientation film, any films can be employed so long as they are capable of imparting orientation property to a layer of liquid crystal. Preferred examples of the orientation film include a film of an organic compound (preferably polymer) subjected to rubbing treatment, an obliquely deposited film of an inorganic compound, and a film having micro grooves. Further, LB film comprising an azobenzene derivative, that is isomerized by means of light to form a thin film of the molecules tilted uniformly in a certain direction, can be used as the orientation film. In addition, a layer prepared by orienting dielectric materials by application of electric field or magnetic field can be employed as the orientation film.

Examples of polymers for the orientation film include polyimide, polystyrene, gelatin, polyvinyl alcohol and polyvinyl alcohol having an alkyl group (preferably having 6 or more carbon atoms). Orientation films obtained by subjecting films of these polymers to orientation treatment, are capable of tilting obliquely discotic liquid crystal.

The polyvinyl alcohol having an alkyl group is especially preferred from the viewpoint of uniform orientation of the discotic liquid crystal. It is presumed that interaction between the alkyl chain on the orientation film and the discotic liquid crystal gives high orientation. The alkyl group of the polyvinyl alcohol is preferably present as a side or terminal group of the polyvinyl alcohol, and especially as a terminal group. The alkyl group preferably has 6–14 carbon atoms, and the alkyl group is preferably attached to the polyvinyl alcohol through —S—, —(CH$_3$)C(CN)— or —(C$_2$H$_5$)N—CS—S—. The polyvinyl alcohol preferably has a saponification value of not less than 80% and a degree of polymerization of not less than 200. The polyvinyl alcohol having an alkyl group is available as trade names of MP103, MP203 and R1130 (produced by Kuraray Co., Ltd.)

Preferred examples of the polyvinyl alcohol having an alkyl group are those having one of the following structures:

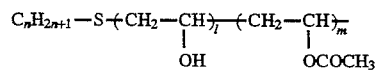

$$\begin{cases} 1 = 80\text{--}99 \\ m = 20\text{--}1 \\ n = 8, 10, 12 \end{cases}$$

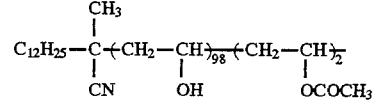

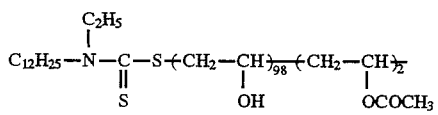

Polyimide film, which is widely used as an orientation film for a liquid crystal cell, is also preferably employed as the orientation film of the invention. The polyimide film can be prepared by coating a solution of polyamic (polyamide) acid (e.g., a series of LQ/LX available from Hitachi Chemical Co., Ltd.; and a series of SE available from Nissan Chemical Industries, Ltd.) on the transparent support, dried at 100° to 300° C. for 0.5 to 1 hour, and rubbing a surface of the resultant polyimide film.

The orientation film for the dicotic liquid crystal can be rubbed in the known manner which is conventionally performed to prepare an orientation film for liquid crystal of LCD. In more detail, the treatment is a method that gives a function of orienting a liquid crystal to a surface of the orientation film by rubbing the surface in a certain direction by the use of a paper, a gauze, a felt, a rubber, or a fiber of polyamide or polyester. The rubbing procedure is generally performed by rubbing a surface of the orientation film in several times using a cloth in which fibers having uniform length and width are arranged.

The orientation film has a function of defining an orientation direction of a discotic liquid crystal provided thereon by a coating method. The orientation conditions of a discotic liquid crystal are dependent upon nature or the like of the orientation film, and therefore the discotic liquid crystal and the orientation film are needed to be combined in most appropriate conditions.

For example, a discotic liquid crystal uniformly oriented is tilted at a certain angle (θ) to a surface of the support, whereas the angle scarcely depends on nature of the orientation film and mostly depends on nature or combination of discotic liquid crystals. Therefore, the angle can be finely controlled within a certain range by mixing two or more kinds of discotic liquid crystals or mixing a discotic liquid crystal and an anologous compound and at an appropriate mixed ratio. Thus, the angle of the oblique orientation is generally conducted by selecting the natures of discotic liquid crystals or mixing them.

Figure 2:
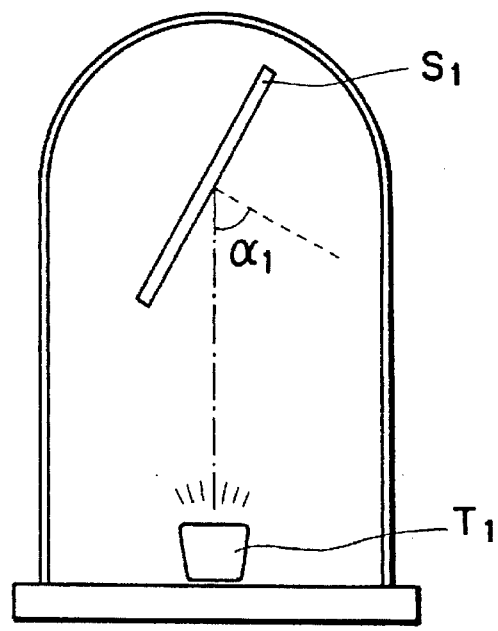
FIG. 2 is a sectional view of a metallizing apparatus employed in the case that the support is metallized in the fixed condition.
Figure 3:
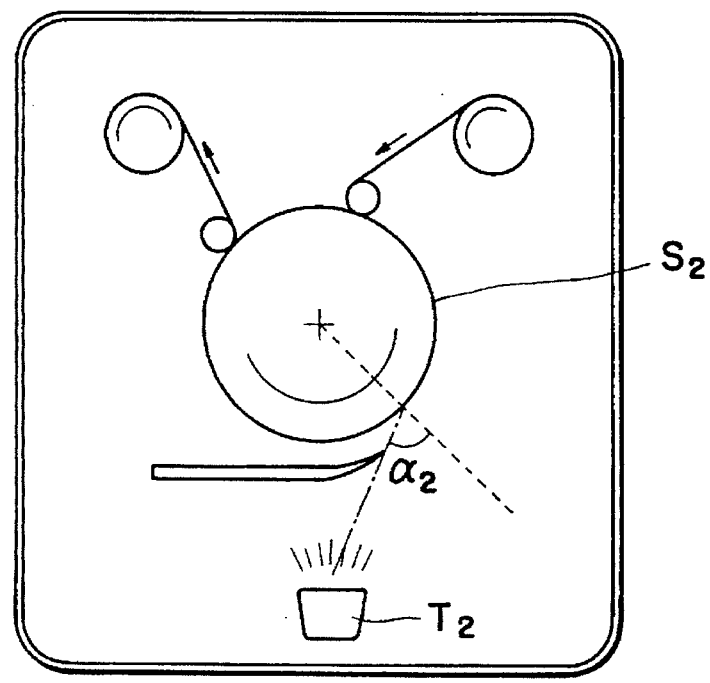
FIG. 3 is a sectional view of a metallizing apparatus employed in the case that the support is continuously metallized to give a film.

As the orientation film, an obliquely deposited film of an inorganic compound is employable in the invention. Examples of the inorganic compounds include metal oxides or metal fluorides such as SiO, $TiO_2$, $MgF_2$ and $ZnO_2$ and metals such as Au and Al. As the inorganic compound, any compounds can be employed so long as they have high dielectric constant (permittivity). The obliquely deposited film of an inorganic compound can be prepared using the metallizing apparatus illustrated in FIG. 2 or 3. The metallizing apparatus of FIG. 2 is employed in the case that the support is metallized in the fixed condition, and the metallizing apparatus of FIG. 3 is employed in the case that the support is continuously metallized to give a film. In FIG. 2, the support $S_1$ is arranged in a such a manner that an angle where a normal line of the support $S_1$ and the evaporating direction from an evaporation source $T_1$ intersect becomes $\alpha_1$ ($\alpha_1$=88–30 degrees). In FIG. 3, the support film $S_2$ is arranged in a such a manner that an angle where a normal line of a tangent line of the support film $S_2$ and the evaporating direction from an evaporation source $T_2$ intersect becomes $\alpha_2$ ($\alpha_2$=88–30 degrees). In the case of using $SiO_2$ as the evaporation material, vapor deposition at a deposition angle of 65 to 68 degree gives an orientation film on which a discotic liquid crystal is uniformly oriented in the direction where the deposited particle column and the optic axis of the discotic liquid crystal almost intersect at right angle.

Examples of the discotic liquid crystals employed in the invention include the following compounds:

Compounds include benzene derivatives described in C. Destrade et al., Mol. Cryst. vol. 71, pp. 111, 1981, cyclohexane derivatives described in B. Kohn et al., Angew. Chem. vol. 96, pp. 70, 1984, macrocyclic compounds of azacrown-type or phenylacetylene-type described in J. M. Lehn et al., J. Chem. Commun. pp. 1794, 1985, and J. Zhang et al., J. Am. Chem. Soc. vol. 116, pp. 2655, 1994. The discotic liquid crystal generally has a structure that the above compound is located at a center of the crystal as a parent core and further straight chain groups such as alkyl, alkoxy and benzoyl having a substituent are radially bonded to the compound. As the discotic liquid crystals, any discotic liquid crystals can be employed, so long as the liquid crystals have negative uniaxial property and orientation property.

Preferred examples of the discotic liquid crystals employable in the invention are described below.

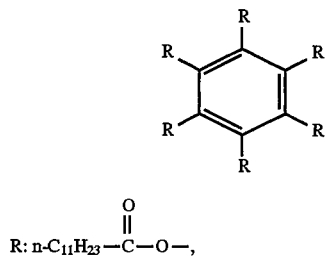

TE-1

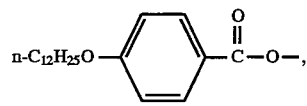

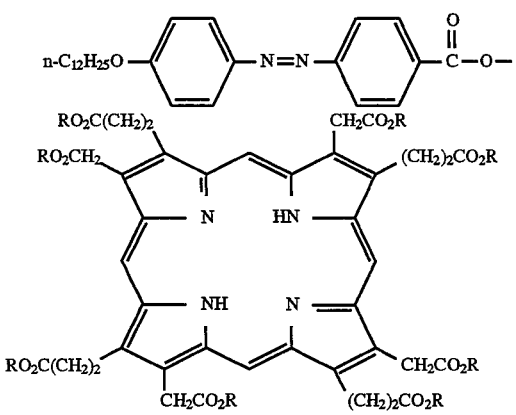

TE-2

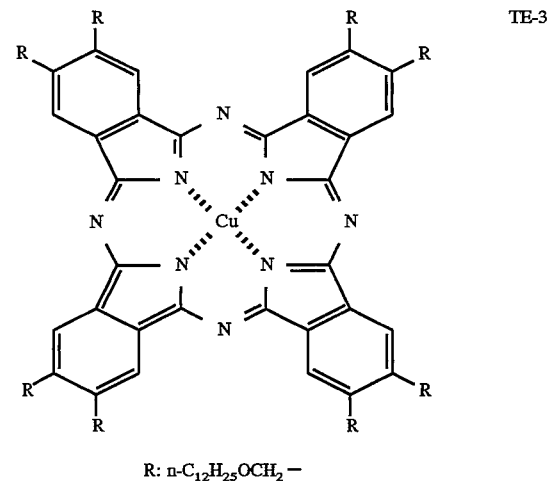

TE-3

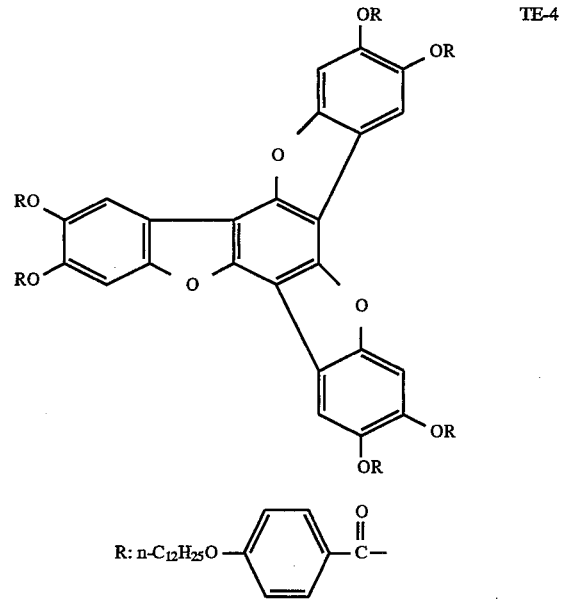

TE-4

-continued
TE-5
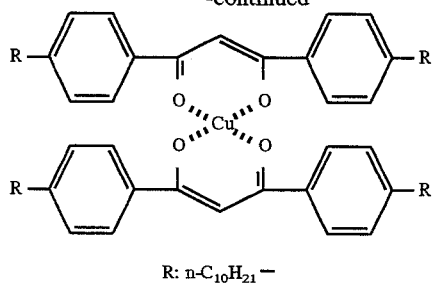
R: n-C₁₀H₂₁—
TE-6
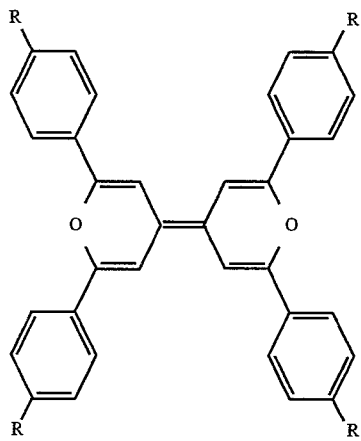
R: n-C₈H₁₇—
TE-7
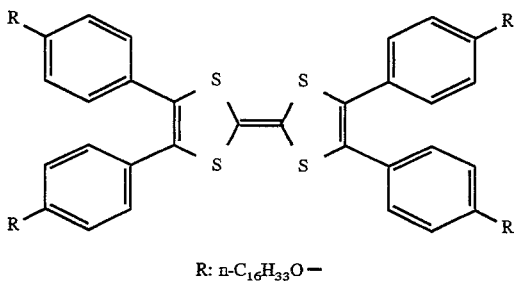
R: n-C₁₆H₃₃O—
TE-8
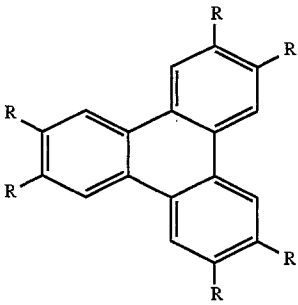
R: (1) n-C$_m$H$_{2m+1}$O—  (m = an integer of 1–15),
(2) n-C₈H₁₇—C(=O)—O—,
(3) n-C₈H₁₇O—C₆H₄—C(=O)—O—,
-continued
(4) 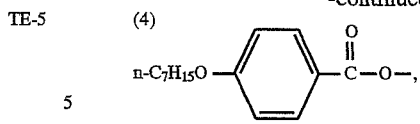
n-C₇H₁₅O—C₆H₄—C(=O)—O—,
(5) 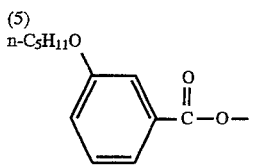
n-C₅H₁₁O—C₆H₄—C(=O)—O—,
(6) 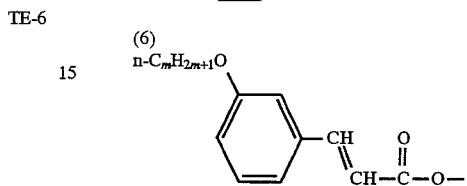
n-C$_m$H$_{2m+1}$O—C₆H₄—CH=CH—C(=O)—O—
(m = an integer of 7–10),
(7) 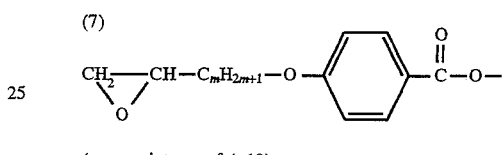
CH₂—CH—C$_m$H$_{2m+1}$—O—C₆H₄—C(=O)—O—
 \\O/
(m = an integer of 4–10),
or
(8) 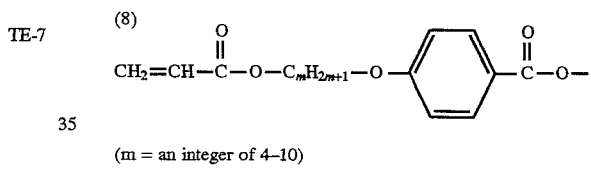
CH₂=CH—C(=O)—O—C$_m$H$_{2m+1}$—O—C₆H₄—C(=O)—O—
(m = an integer of 4–10)
TE-9
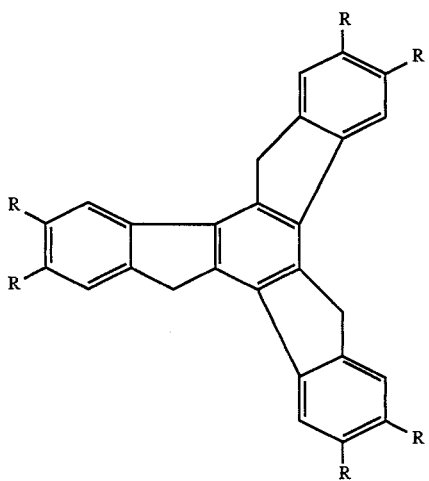
R: (1) n-C₁₄H₂₉—C(=O)—O—,
(2) n-C₁₆H₃₃O—C₆H₄—C(=O)—O—,
or -continued (3) 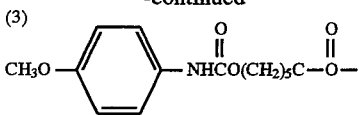

TE-10

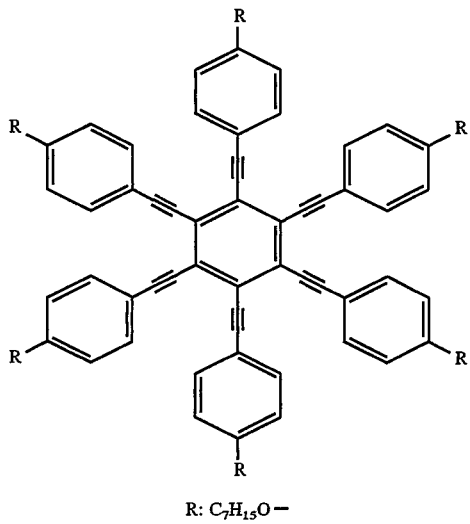

R: $C_7H_{15}O-$

TE-11

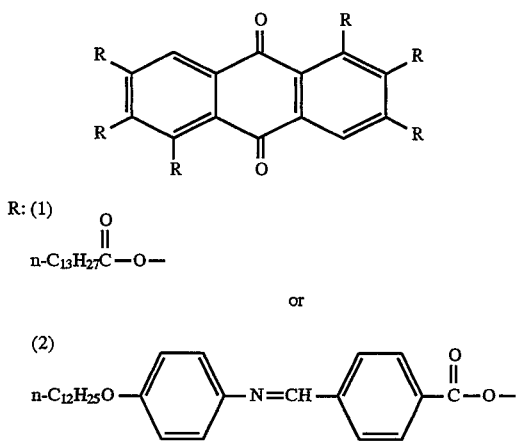

R: (1)
$$n\text{-}C_{13}H_{27}\overset{O}{\underset{\|}{C}}-O-$$

or (2)

The layer prepared from a discotic liquid crystal of a low molecular weight of the invention includes a layer of discotic liquid crystal of a low molecular weight, and a layer formed by polymerizing and/or cross-linking a discotic liquid crystal having a functional group capable of reacting or polymerizing by means of heat or light. The polymerized liquid crystal has no liquid crystal property.

In the case that the discotic liquid crystal is once oriented on the orientation film, the liquid crystal is stable at a temperature not higher than a transition temperature of from discotic liquid crystal phase to solid phase. Therefore, an optical anisotropy (optical compensatory sheet) containing the layer of the discotic liquid crystal is stable to heat. LCD to be loaded on a vehicle needs excellent heat-resistance. The layer of discotic liquid crystal formed by polymerizing and/or cross-linking mentioned above exhibits excellent heat-resistance, and therefore an optical compensatory sheet containing such layer is preferably used for LCD to be used in a moter car or other vehicles.

The negative uniaxial property of the invention, that the layer of the discotic liquid crystal generally has, means property as satisfies the condition of:

$n_1 < n_2 = n_3$ in which $n_1$, $n_2$ and $n_3$ are refractive indices in the three axes directions of a discotic liquid crystal and $n_1$, $n_2$ and $n_3$ satisfy $n_1 \leq n_2 \leq n_3$. However, $n_2$ and $n_3$ are not required to be strictly equal to each other and it will be satisfied that they are approximately equal to each other. In more detail, there is no problem in practical use as long as the negative uniaxial property satisfies the condition of:

$|n_2-n_3|/|n_2-n_1| \leq 0.2$ in which $n_1$, $n_2$ and $n_3$ have the meanings described above.

In order to greatly improving viewing angle characteristics of TN-LCD or TFT-LCD, the optic axes of the layer of the discotic liquid crystal is preferably inclined at 5 to 50 degrees to a normal line of the sheet (shown by $\beta$ in FIG. 4), more preferably at 10 to 40 degrees, and especially 20 to 35 degrees.

Further, it is preferred that the discotic liquid crystal layer satisfies the condition of:

$50 \leq \Delta n \cdot D \leq 400$ (nm)

in which D is a thickness of the sheet and $\Delta n = n_2 - n_1$.

The optical compensatory sheet employed in the invention obtained in the above manner is greatly improved in coloring of a displayed image and reversing of black-and-white image when the viewing direction is greatly inclined to above or below, or to the right or left to the normal to a surface of the display. Thus, the liquid crystal display provided with the optical compensatory sheet shows excellent viewing characteristics such as enlargement of viewing angle.

The reason why the optical compensatory sheet employed in the invention gives much increase of viewing angle is assumed as follows:

Most of TN-LCD adopt normally white mode. In the mode, a light transmittance in a black display portion increases extremely with increase of viewing angle, which results in rapid reduction of contrast. In the condition of black display (the condition where voltage is applied), it is considered that TN-type liquid crystal cell shows an optically anisotropic property and a positive uniaxial property which is slightly inclined from a normal line to a surface of the cell.

In the case that an optic axis of the TN-type liquid crystal cell is inclined from the normal line to a surface of the cell, use of a optically anisotropic substance having an optic axis in a normal line direction is considered not to appropriately compensate the phase difference by the cell. In other words, an optically anisotropic substance is needed for the cell to have an optic axis inclined from the normal line. Further, when the cell is regarded as a composite of optically anisotropic substances with a positive uniaxial property, an optically anisotropic substance having a negative uniaxial property is suitably used for compensation of phase difference by the cell. Thus, use of an optically anisotropic substance of a negative uniaxial property having optic axis inclined from the normal line improves viewing angle characteristics.

However, it is mere approximation that the liquid crystal cell behaves as optically anisotropic substance with a positive uniaxial property having optic axis inclined from the normal line. Therefore, use of the optically anisotropic substance does not give satisfactorily compensation of phase difference.

From study of the inventors, it has discovered that the TN-type liquid crystal cell can be regarded as a composite of two optically anisotropic substances having a positive uniaxial property which has a inclined angle equal to each other and inclination direction differing from each other. When an intermediate gradation is displayed, optic axes of the optically anisotropic substances are further inclined from the normal line to a surface of the cell.

In the case that the TN-type liquid crystal cell is considered as above, great improvement of viewing angle characteristics can be obtained by employing the optical compensatory sheet which is prepared by, for example, superposing an optical anisotropic substance (element) having an optically negative monoaxial and an inclined optic axis (preferably inclined at 5 to 50 degree to the normal), on an optically anisotropic substance (element) having an optically negative monoaxial and an optic axis in the normal direction.

Such optical compensatory sheet is included in an optical compensatory sheet having the incident direction of light showing the minimum of absolute values of retardation values in a direction inclined from the normal of the sheet and having no optic axis (i.e., an optical compensatory sheet having an optical anisotropy wherein the minimum of absolute values of retardation values in the directions at all angles to the normal of the sheet is not present in the normal direction and a surface direction of the sheet and the Re value is not zero in any directions).

As described previously, the optically compensatory sheet employed in the invention, which contains the above optically compensatory sheet, can be easily prepared by coating a coating solution for forming an orientation film on a transparent film (preferably having a negative uniaxial property and an optic axis in the normal line direction), and then coating a solution containing a discotic liquid crystal on the orientation film in thin thickness. In the process, it is required to obliquely and uniformly orient the discotic liquid crystal. In more detail, the oblique orientation is preferably performed by coating a solution containing the discotic liquid crystal on an orientation film subjected to orientation treatment provided on the transparent support to form a layer of the discotic liquid crystal, and then heating the layer to a temperature forming discotic nematic liquid crystal phase. This heating brings about the orientation of the discotic liquid crystal. Thereafter, the layer is cooled with maintaining the orientation to room temperature and the layer is made solid.

Although the temperature forming discotic nematic liquid crystal phase is an inherent value (temperature) of the discotic nematic liquid crystal, the temperature can be controlled within a desired range by mixing two or more kinds of discotic liquid crystals and changing the mixed ratio. The temperature forming discotic nematic liquid crystal phase preferably is in the range of 70° to 300° C., and especially in the range of 70 to 150° C.

Figure 4:
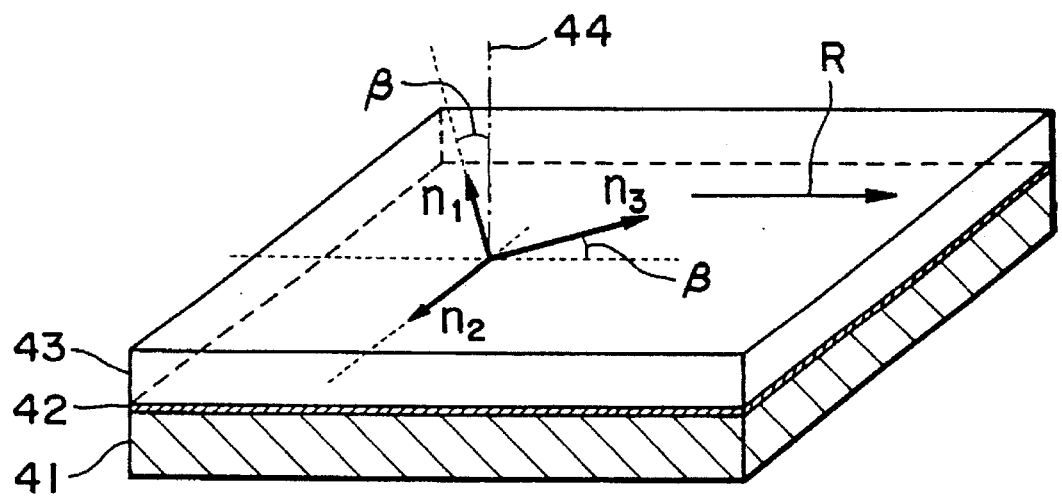
FIG. 4 is a sectional view schematically showing the representative structure of the optically compensatory sheet employed for the liquid crystal display of the invention.

The representative structure of the optically compensatory sheet employed in the invention is shown in FIG. 4. In FIG. 4, a transparent support 41, an orientation film 42 and a layer of discotic liquid crystal 43 are superposed in order to constitute the optically compensatory sheet. The reference number R indicates the rubbing direction of the orientation film. The reference numbers $n_1$, $n_2$ and $n_3$ indicate refractive indices in the three axes direction of a discotic liquid crystal, and $n_1$, $n_2$ and $n_3$ satisfy the condition of $n_1 \leq n_2 \leq n_3$, in the case that are seen in the front direction. The reference number β is an inclined angle of the optic axis to the normal 44 of the layer of the discotic liquid crystal.

Figure 5:
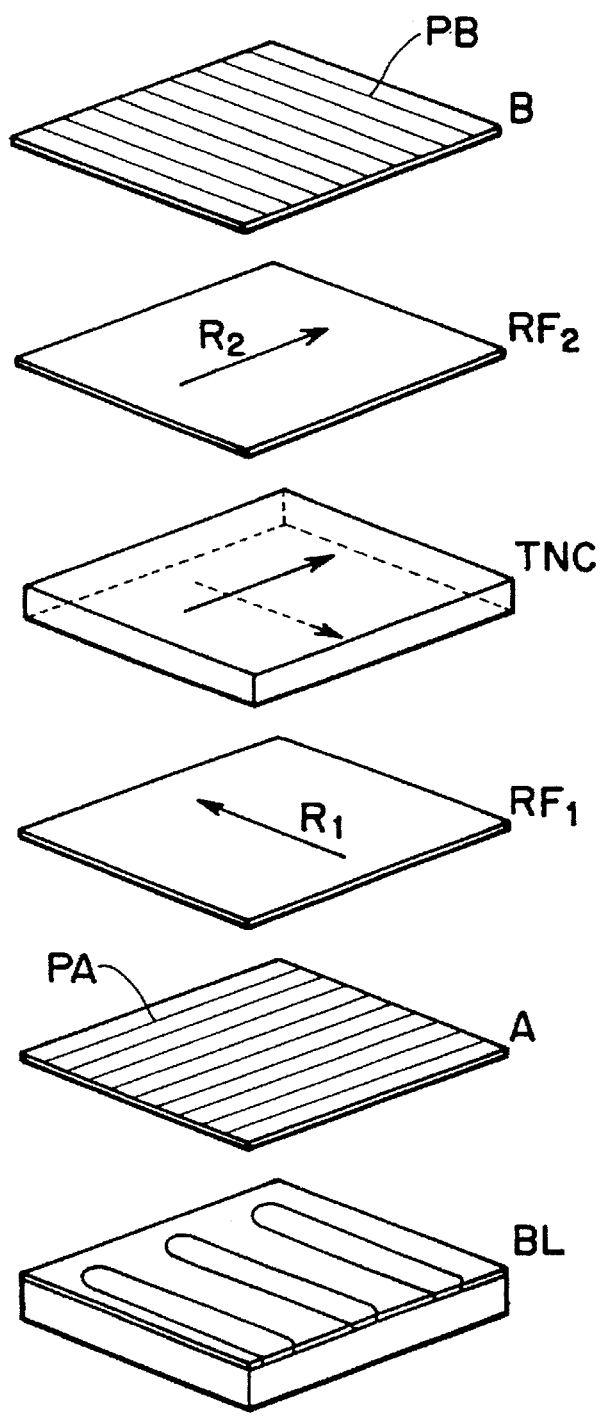
FIG. 5 is a sectional view schematically showing the representative structure of the liquid crystal display of the invention.

The representative structure of the liquid crystal display of the invention is shown in FIG. 5. In FIG. 5, a liquid crystal cell TNC comprising a pair of substrates provided with a transparent electrode and a twist-oriented nematic liquid crystal sealed therebetween, a pair of polarizing sheets A and B arranged on the either side of the cell, the optical compensatory sheets $RF_1$ and $RF_2$ between the liquid crystal cell and the polarizing sheet and back light BL are assembled to constitute the liquid crystal display. The optical compensatory sheet may be arranged only on one side (i.e., use of one of $RF_1$ and $RF_2$). The reference number $R_1$ is a rubbing direction of the orientation film of the optical compensatory sheets $RF_1$, and the reference number $R_2$ is the rubbing direction of the orientation film of the optical compensatory sheets $RF_2$, in the case that are seen in the front direction. PA and PB are polarizing axes of polarizing sheets A and B, respectively.

As materials of liquid crystal employed for the liquid crystal cell, any known materials can be employed so long as they are TN-LC or STN-LC. As materials of the polarizing sheet employed for the liquid crystal cell, any known materials can be employed so long as they have polarizing property.

Examples of the present invention and comparison examples are given below, but these examples by no means restrict the invention.

EXAMPLE 1

Preparation of support

Triacetyl cellulose (weight-average molecular weight: 130,000, in terms of polystyrene) was dissolved in dichloromethane to prepare a copolymer solution. The polymer solution was casted on a stainless belt and peeled off to prepare a film. Then, the film was stretched in a widthwise direction and in a lengthwise (MD) direction and subjected to orientation relaxation by heating. Thus, triacetyl cellulose films having various surface orientation (TF-1 to TF-5) were prepared.

"(nx−ny)×d" and "(nx+ny)/2−nz" of the prepared films were determined, in which nx and ny is main refractictive indices within the film, nz is a main refractive index in a thickness direction, and d is a thickness of the film.

The thickness was measured with a micrometer, Re value in front direction was measured by an ellipsometer (AEP-100, available from Shimadzu Seisakusho, Ltd.) to regard the value as "(nx−ny)×d", and "(nx+ny)/2−nz" was determined by measuring "ny" with Abbe refractometer and calculating "(nx+ny)/2−nz" using the value of "ny" and "nz" calculated from Re values measured at various angles. Further, as for PES of Example 12 and TF-6 of Example 14 as described later, the above measurements were performed.

The obtained result is set forth in Table 1.

TABLE 1

| Support | Thickness [d] (μm) | (nx − ny) × d (nm) | {(nx + ny)/2 − nz} × d (nm) |
|---------|---------------------|---------------------|-------------------------------|
| TF-1 | 85 | 3 | 17 |
| TF-2 | 83 | 5 | 40 |
| TF-3 | 80 | 10 | 78 |
| TF-4 | 86 | 8 | 121 |
| TF-5 | 82 | 11 | 245 |
| PES | 100 | 3 | 60 |
| TF-6 | 127 | 18 | 71 |

The result of Table 1 shows that each of the films (TF-1 to TF-6 and PES) satisfies the condition of nx≈ny>nz.

Accordingly, it is apparent that these films show negative uniaxial property.

Preparation of optical compensatory sheet

On the triacetyl cellulose film (TF-1), a thin layer of gelatin (0.1 μm) was formed. A coating solution containing polyvinyl alcohol having long chain alkyl groups (MP-203, produced by Kuraray Co., Ltd.) was coated on the gelatin layer, dried using warm air to form a layer of the polyvinyl alcohol and rubbing a surface of the layer to form an orientation film.

On the orientation film, a coating solution of 10 weight % obtained by dissolving a mixture of the discotic liquid crystal TE-8-(3) and the discotic liquid crystal TE-8-(5) (compounds previously mentioned; mixed ratio: TE-8-(3) :TE-8-(5)=9:1, by weight) in methyl ethyl ketone was coated at 2,000 rpm using a spin-coater. Thereafter, the coated layer was heated to 145° C., subjected to heat treatment, and cooled to room temperature to form a layer of the discotic liquid crystal having a thickness of 1.0 μm. Thus, an optical compensatory sheet (RTF-1) was obtained.

Similarly, by using the triacetyl cellulose films (TF-2 to TF-5), optical compensatory sheets (RTF-2 to RTF-5) were obtained.

EXAMPLE 2

The procedure of Example 1 was repeated except for using a glass plate (thickness: 1 mm) showing optically isotropy in place of the triacetyl cellulose film to prepare an optical compensatory sheet (RG-1).

EXAMPLE 3

The procedure of Example 2 was repeated except for forming no gelatin layer and changing the ratio of the discotic liquid crystal TE-8-(3) and the discotic liquid crystal TE-8-(5) from 9:1 to 4:1 to prepare an optical compensatory sheet (RG-2).

EXAMPLE 4

The procedure of Example 1 was repeated except for using the triacetyl cellulose film of TF-3 and changing the ratio of the discotic liquid crystal TE-8-(3) and the discotic liquid crystal TE-8-(5) from 9:1 to 4:1 to prepare an optical compensatory sheet (RTF-6).

EXAMPLE 5

The procedure of Example 2 was repeated except for forming no gelatin layer and using the mixture of the discotic liquid crystal TE-8-(7) (m=5) and ethylene glycol (mixed ratio=4:1, by weight) in place of the mixture of the discotic liquid crystal TE-8-(3) and the discotic liquid crystal TE-8-(5) to prepare an optical compensatory sheet (RG-3).

EXAMPLE 6

The procedure of Example 1 was repeated except for using the triacetyl cellulose film of TF-3 and using the mixture of the discotic liquid crystal TE-8-(7) (m=5) and ethylene glycol (mixed ratio=4:1) in place of the mixture of the discotic liquid crystal TE-8-(3) and the discotic liquid crystal TE-8-(5) to prepare an optical compensatory sheet (RG-3).

EXAMPLE 7

The procedure of Example 2 was repeated except for forming no gelatin layer, changing the concentration of the coating solution of the discotic liquid crystals from 10% to 7% and changing a thickness of the layer of discotic liquid crystal from 1.0 μm to 0.7 μm to prepare an optical compensatory sheet (RG-4).

EXAMPLE 8

The procedure of Example 1 was repeated except for using the triacetyl cellulose film of TF-3, changing the concentration of the coating solution of the discotic liquid crystals from 10% to 7% and changing a thickness of the layer of discotic liquid crystal from 1.0 μm to 0.7 μm to prepare an optical compensatory sheet (RTF-8).

EXAMPLE 9

The procedure of Example 2 was repeated except for forming no gelatin layer, changing the concentration of the coating solution of the discotic liquid crystals from 10% to 20% and changing a thickness of the layer of discotic liquid crystal from 1.0 μm to 2.0 μm to prepare an optical compensatory sheet (RG-5).

EXAMPLE 10

The procedure of Example 1 was repeated except for using the triacetyl cellulose film of TF-3, changing the concentration of the coating solution of the discotic liquid crystals from 10% to 20% and changing a thickness of the layer of discotic liquid crystal from 1.0 μm to 2.0 μm to prepare an optical compensatory sheet (RTF-9).

EXAMPLE 11

On a glass plate (thickness: 1 mm) showing optically isotropy, a coating solution of polyamic acid (SE-7210, available from Nissan Chemical Industries, Ltd.) was coated, burned at 180° C. to form a polyimide layer and rubbing a surface of the layer to form an orientation film.

On the orientation film, a coating solution of 10 weight % obtained by dissolving the discotic liquid crystal TE-8-(4) (compounds previously mentioned) in methyl ethyl ketone was coated at 2,000 rpm using a spin-coater. Thereafter, the coated layer was heated to 180° C. in a thermostat, subjected to heat treatment and cooled to room temperature to form a layer of the discotic liquid crystal having a thickness of 1.0 μm. Thus, an optical compensatory sheet (RG-6) was obtained.

EXAMPLE 12

The procedure of Example 11 was repeated except for using a polyethersulfone film (PES) of a thickness of 100 μm (FS-1300, available from Sumitomo Bakelite Co., Ltd.) having in place of the glass plate to prepare an optical compensatory sheet (RTF-10).

EXAMPLE 13

On a glass plate (thickness: 1 mm) showing optically isotropy, SiO was obliquely deposited using the continuous metallizing apparatus shown in FIG. 5 to form an orientation film. The deposition was conducted under the conditions of film feeding rate of 10 m/minute, deposition source temperature of 1800K and minimum deposition angle of 85 degrees.

On the orientation film, a coating solution of 10 weight % obtained by dissolving the discotic liquid crystal TE-9-(1) (compounds previously mentioned) in methyl ethyl ketone was coated at 2,000 rpm using a spin-coater. Thereafter, the coated layer was heated to 150° C., subjected to heat treatment and cooled to room temperature to form a layer of the discotic liquid crystal having a thickness of 1.0 μm. Thus, an optical compensatory sheet (RG-7) was obtained.

EXAMPLE 14

The procedure of Example 13 was repeated except for using a triacetyl cellulose film of a thickness of 85 μm (TF-6.) having a gelatin layer (0.1 μm) on the orientation film side of the film and an antistatic layer on the back of the film in place of the glass plate to prepare an optical compensatory sheet (RTF-11).

EXAMPLE 15

On a glass plate (thickness: 1 mm) showing optically isotropy, a coating solution containing polyvinyl alcohol having long chain alkyl groups (MP-203, produced by Kuraray Co., Ltd.) was coated, dried using warm air to form a layer of the polyvinyl alcohol and rubbing a surface of the layer to form an orientation film.

On the orientation film, a coating solution of 10 weight % obtained by dissolving the discotic liquid crystal TE-8-(8)-(m=4) (compound previously mentioned) and a photoinitiator (Michler's ketone:benzophenone=1:1 (by weight), 1 weight % based on the weight of TE-8-(8)-(m=4)) in methyl ethyl ketone was coated at 2,000 rpm using a spin-coater. Thereafter, the coated layer was heated to 145° C., and irradiated using a UV radiation device (16 W) for five minutes to form a layer of the discotic liquid crystal having a thickness of 1.0 μm. Thus, an optical compensatory sheet (RG-8) was obtained.

EXAMPLE 16

The procedure of Example 15 was repeated except for using a triacetyl cellulose film of a thickness of 85 (TF-6) having a gelatin layer (0.1 μm) on the film in place of the glass plate to prepare an optical compensatory sheet (RTF-12).

Evaluation of optical characteristics of optical compensatory sheet

As for the discotic liquid crystal layers of the optical compensatory sheets (RG-1 to RG-8) obtained in Examples 2, 3, 5, 7, 9, 11, 13 and 15, the angle (β) where the optic axis and the normal line of the sheet intersect and Δn·D (D is a thickness of the layer and Δn=$n_2-n_1$, as described above) was determined by calculating from Re values measured at various angles. The measurement was conducted using an ellipsometer (AEP-100, available from Shimadzu Seisakusho, Ltd.) in transmission mode.

The obtained result is set forth in Table 2.

TABLE 2

| Sheet | Δn·D (nm) | β (degree) |
|---|---|---|
| RG-1 | 153 | 35 |
| RG-2 | 151 | 19 |
| RG-3 | 155 | 44 |
| RG-4 | 95 | 35 |
| RG-5 | 290 | 35 |
| RG-6 | 110 | 40 |
| RG-7 | 120 | 30 |
| RG-8 | 153 | 33 |

From the above measurement of Re values, it was apparent that each of the layers satisfied the condition of $n_1 \approx n_2$. Thus, the above result and that of Table 2 show that each of the layers of the films (RG-1 to RG-8) satisfies the condition of $n_2 \approx n_3 > n_1$. Accordingly, it is apparent that these layers show negative uniaxial property.

EXAMPLE 17

Preparation of liquid crystal display

Each of the optical compensatory sheets obtained in Examples 1–16 was attached to TN-type liquid crystal cell that the product of the difference between an extraordinary ray and an ordinary ray of the liquid crystal and the clearance between the substrats of the liquid crystal cell was 500 nm, and the twisted angle of the liquid crystal was 90 degrees.

The obtained TN-LCD has a structure shown in FIG. 4.

Evaluation of liquid crystal display

To the TN-LCD, a rectangular wave of 40 Hz was applied at a voltage of 0 to 50 V, and transmittances (T) were measured by varying viewing angle using a spectrophotometer (LCD-5000, available from Otsuka Electronics Co., Ltd.). From the measured data, viewing angles in a upper-lower direction and a left-right direction were determined. The viewing angle was defined as the viewing angle that contrast ($T_{1V}/T_{5V}$) in black-and-white display shows 10.

Further, the angle (β) and Re (Δn·D) of each of the discotic liquid crystal layers of the optical compensatory sheets (RTF-1 to RTF-12) was also determined in the same manner as Example 16.

The obtained result is set forth in Table 3.

TABLE 3

| Example | Sheet | Re of Support (nm) | Re of Layer of LC (nm) | Optic angle (β) (degree) | Viewing Angle (degree) upper-lower | Viewing Angle (degree) left-right |
|---|---|---|---|---|---|---|
| Ex. 2 | RG-1 | 0 | 153 | 35 | 70 | 101 |
| Ex. 3 | RG-2 | 0 | 151 | 19 | 68 | 97 |
| Ex. 5 | RG-3 | 0 | 155 | 44 | 60 | 88 |
| Ex. 7 | RG-4 | 0 | 95 | 35 | 67 | 92 |
| Ex. 9 | RG-5 | 0 | 290 | 35 | 65 | 96 |
| Ex. 11 | RG-6 | 0 | 110 | 40 | 60 | 85 |
| Ex. 13 | RG-7 | 0 | 120 | 30 | 70 | 95 |
| Ex. 15 | RG-8 | 0 | 153 | 33 | 73 | 106 |
| Ex. 1 | RTF-1 | 17 | 153 | 35 | 75 | 102 |
| Ex. 1 | RTF-2 | 40 | 153 | 35 | 100 | 112 |
| Ex. 1 | RTF-3 | 78 | 153 | 35 | 125 | 124 |

TABLE 3-continued

| Example | Sheet | Re of Support (nm) | Re of Layer of LC (nm) | Optic angle (β) (degree) | Viewing Angle (degree) upper-lower | Viewing Angle (degree) left-right |
|---|---|---|---|---|---|---|
| Ex. 1 | RTF-4 | 121 | 153 | 35 | 123 | 115 |
| Ex. 1 | RTF-5 | 245 | 153 | 35 | 95 | 98 |
| Ex. 4 | RTF-6 | 78 | 151 | 19 | 126 | 120 |
| Ex. 6 | RTF-7 | 78 | 155 | 44 | 85 | 85 |
| Ex. 8 | RTF-8 | 78 | 95 | 35 | 115 | 103 |
| Ex. 10 | RTF-9 | 78 | 290 | 35 | 85 | 106 |
| Ex. 12 | RTF-10 | 60 | 110 | 40 | 95 | 104 |
| Ex. 14 | RTF-11 | 71 | 120 | 30 | 98 | 122 |
| Ex. 16 | RTF-12 | 78 | 153 | 33 | 117 | 115 |

Note;
Re of support: $\{(nx + ny)/2 - nz\} \times d$
Re of LC layer: $\{(n_2 + n_3)/2 - n_1\} \times d$
Optic angle (β): inclined angle of LC layer From the above measurement of Re values, it was apparent that each of the layers of the sheets (RTF-1 to RTF-12) satisfied the condition of $n_2 \approx n_3$. Thus, the above result and that of Table 3 show that each of the layers of the films (RTF-1 to RTF-12) satisfies the condition of $n_2 \approx n_3 > n_1$. Accordingly, it is apparent that these layers show negative uniaxial property.

Further, the above result and that of Table 3 show that each of the sheets (RTF-1 to RTF-12) has no optic axis and has the incident direction of light showing the minimum of absolute values of retardation values in a direction inclined from the normal of the sheet.

COMPARISON EXAMPLE 1

Preparation of liquid crystal display

The procedure of Example 17 was repeated except for using no optical compensatory sheet and the supports (TF-1 to TF-5) obtained in Examples 1 in place of the optical compensatory sheet to prepare six kinds of TN-LCD.

Optical characteristics such as viewing angles in a upper-lower direction and a left-right direction were determined in the same manner as Example 17.

The obtained result is set forth in Table 4.

TABLE 4

| Example | Film | Re of Support (nm) | Re of Layer of LC (nm) | Optic angle (β) (degree) | Viewing Angle (degree) upper-lower | Viewing Angle (degree) left-right |
|---|---|---|---|---|---|---|
| Com. Ex. 1 | — | 0 | — | — | 53 | 70 |
|  | TF-1 | 17 | — | — | 55 | 75 |
|  | TF-2 | 40 | — | — | 60 | 80 |
|  | TF-3 | 78 | — | — | 60 | 85 |
|  | TF-4 | 121 | — | — | 45 | 90 |
|  | TF-5 | 245 | — | — | 38 | 70 |

We claim:

1. A liquid crystal display comprising a liquid crystal cell which comprises a pair of substrates each of which is provided with a transparent electrode and twist-oriented nematic liquid crystal sealed therebetween, a polarizing sheet arranged on each side of the liquid crystal cell, and an optical compensatory sheet provided between at least one side of the liquid crystal cell and the polarizing sheet;

wherein the optical compensatory sheet comprises a transparent support having a negative uniaxial property and a layer provided thereon which is prepared from a discotic liquid crystal of a low molecular weight.

2. The liquid crystal display as defined in claim 1, wherein the layer of a discotic liquid crystal has an optic axis inclined at 5 to 50 degrees to the normal of the layer.

3. The liquid crystal display as defined in claim 1, wherein an orientation film is provided between the transparent support and the layer of a discotic liquid crystal.

4. The liquid crystal display as defined in claim 3, wherein the orientation film is a polymer film which has been subjected to rubbing treatment.

5. The liquid crystal display as defined in claim 3, wherein the orientation film is a film of polyvinyl alcohol having an alkyl group which has been subjected to rubbing treatment.

6. The liquid crystal display as defined in claim 3, wherein the orientation film is prepared by obliquely depositing an inorganic compound on the support.

7. The liquid crystal display as defined in claim 1, wherein the transparent support has a light transmittance of not less than 80%, shows optically isotropy on the plane of the support, and satisfies the condition of:

$$30 \leq \{(nx+ny)/2-nz\} \times d \leq 150$$

in which nx and ny are main refractive indices on the plane of the support, nz is a main refractive index in the thickness direction, and d is the thickness of the support, unit of d being nm.

8. The liquid crystal display as defined in claim 1, wherein the transparent support is a triacetyl cellulose film.

9. The liquid crystal display as defined in claim 8, wherein the transparent support has a light transmittance of not less than 80%, shows optically isotropy on the plane of the support, and satisfies the condition of:

$$30 \leq \{(nx+ny)/2-nz\} \times d \leq 150$$

in which nx and ny are main refractive indices on the plane of the support, nz is a main refractive index in the thickness direction, and d is the thickness of the support, unit of d being nm.

10. The liquid crystal display as defined in claim 1, wherein the layer of a discotic liquid crystal has an optic axis inclined from the normal of the layer.

11. A liquid crystal display comprising a liquid crystal cell which comprises a pair of substrates each of which is provided with a transparent electrode and twist-oriented nematic liquid crystal sealed them between, a polarizing sheet arranged on each side of the liquid crystal cell, and an optical compensatory sheet provided between at least one side of the liquid crystal cell and the polarizing sheet;

wherein the optical compensatory sheet has an optical anisotropy wherein the minimum of absolute values of retardation values in the directions at all angles to the normal of the sheet is not present in the normal direction and a surface direction of the sheet and the retardation value of the sheet is not zero in any direction.

12. The liquid crystal display as defined in claim 11, wherein the optical compensatory sheet comprises two elements having optical anisotropy and optical characteristics differing from each other, in which one of the elements has an optically negative monoaxial and an optic axis in its normal direction, and the other element has an optically negative monoaxial and an optic axis inclined at 5 to 50 degrees to its normal.

13. The liquid crystal display as defined in claim 12, wherein the element having an optically negative monoaxial and an optic axis in the normal direction is a transparent support, has a light transmittance of not less than 80%, shows optically isotropy on the plane of the support, and satisfies the condition of:

$$30 \leq \{(nx \times ny)/2 - nz\} \times d \leq 150$$

in which nx and ny are main refractive indices on the plane of the support, nz is a main refractive index in the thickness direction, and d is the thickness of the support, unit of d being nm.

14. The liquid crystal display as defined in claim 12, wherein the element having an optically negative monoaxial and an optic axis in the normal direction is a triacetyl cellulose film.

15. The liquid crystal display as defined in claim 11, wherein the optical compensatory sheet has a layer which is prepared from a discotic liquid crystal of a low molecular weight.

16. A liquid crystal display comprising a liquid crystal cell which comprises a pair of substrates each of which is provided with a transparent electrode and twist-oriented nematic liquid crystal sealed therebetween, a polarizing sheet arranged on each side of the liquid crystal cell, and an optical compensatory sheet provided between at least one side of the liquid crystal cell and the polarizing sheet;

wherein the optical compensatory sheet comprises a transparent support, an orientation film thereon and a layer provided on the orientation film which is prepared from a discotic liquid crystal of a low molecular weight, the orientation layer being a film of polyvinyl alcohol having an alkyl group which has been subjected to rubbing treatment.

17. The liquid crystal display as defined in claim 16, wherein the layer of a discotic liquid crystal has an optic axis inclined from the normal of the layer.

18. The liquid crystal display as defined in claim 16, wherein the layer of a discotic liquid crystal has an optic axis inclined at 5 to 50 degrees to the normal of the layer.

19. A liquid crystal display comprising a liquid crystal cell which comprises a pair of substrates each of which is provided with a transparent electrode and twist-oriented nematic liquid crystal sealed therebetween, a polarizing sheet arranged on each side of the liquid crystal cell, and an optical compensatory sheet provided between at least one side of the liquid crystal cell and the polarizing sheet;

wherein the optical compensatory sheet comprises a transparent support and a layer provided thereon which is prepared from a discotic liquid crystal of a low molecular weight, the transparent support having a light transmittance of not less than 80%, showing optically isotropy on the plane of the support, and satisfying the condition of:

$$30 \leq \{(nx+ny)/2 - nz\} \times d \leq 150$$

in which nx and ny are main refractive indices on the plane of the support, nz is a main refractive index in the thickness direction, and d is the thickness of the support, unit of d being nm.

20. The liquid crystal display as defined in claim 19, wherein the layer of a discotic liquid crystal has an optic axis inclined from the normal of the layer.

21. The liquid crystal display as defined in claim 19, wherein the layer of a discotic liquid crystal has an optic axis inclined at 5 to 50 degrees to the normal of the layer.

* * * * *